United States Patent [19]

Petignat

[11] Patent Number: 5,779,422
[45] Date of Patent: Jul. 14, 1998

[54] DEVICE FOR JOINING TWO ELEMENTS

[75] Inventor: Maurice Petignat, Rue du Bois-Noir 27, La Chaux-de-Fonds, Switzerland

[73] Assignees: Maurice Petignat, Switzerland; Etablissements Sarran S.A., France

[21] Appl. No.: 737,149

[22] PCT Filed: Apr. 26, 1995

[86] PCT No.: PCT/IB95/00299

§ 371 Date: Nov. 4, 1996

§ 102(e) Date: Nov. 4, 1996

[87] PCT Pub. No.: WO95/30837

PCT Pub. Date: Nov. 16, 1995

[30] Foreign Application Priority Data

May 4, 1994 [CH] Switzerland .................. 1405/94

[51] Int. Cl.[6] .................................................. F16B 21/00
[52] U.S. Cl. .................. 411/551; 411/552; 411/553
[58] Field of Search .............................. 411/349, 549, 411/550, 551, 552, 553

[56] References Cited

U.S. PATENT DOCUMENTS 2,465,548  3/1949  Michael ........................ 411/552 X
5,370,488  12/1994 Sykes ........................... 411/552 X
5,688,093  11/1997 Bowers ........................... 411/552
5,690,460  11/1997 Attanasio ....................... 411/552 X

FOREIGN PATENT DOCUMENTS

89/07719  8/1989  WIPO ............................. 411/552

Primary Examiner—Neill R. Wilson
Attorney, Agent, or Firm—Silverman, Cass & Singer, Ltd.

[57] ABSTRACT

Two secateur jaws are jointed together by means of a pin with radial lugs engaging a ring attached to one jaw and extending through a sleeve slidably arranged in the two jaws. Said sleeve encloses a helical return spring between the sleeve and the head of the pin. The head of the sleeve has an external screw thread with a ring screwed thereon for adjusting the tension of the spring. The sleeve may be moved axially by screwing said ring on or off to change the tension of the spring and thus the force exerted by the latter on said jaws, whereby the engagement pressure therebetween also changes.

3 Claims, 2 Drawing Sheets

DEVICE FOR JOINING TWO ELEMENTS

BACKGROUND OF THE INVENTION

1. Field of the Invention

The present invention relates to a whole constituted by two elements assembled to each other and by a device to permit their assembling. The said device comprises a stud secured to one of the said elements by at least one radial lug provided for this purpose. The said element is provided with a passage for the said lug and, on its outer face, with a recess intended to receive said lug, in which the lug is maintained by means of a return resilient device bearing on the one hand on the said stud and, on the other hand, at least indirectly, on the said element. The assembly device comprises a sleeve, the bottom of which is provided with an opening to permit the passage of the lug of the stud, the return resilient device being located in the said sleeve and bearing on the one hand on the bottom thereof and on the other hand on the stud. The said sleeve is engaged in the two elements to be assembled, in which it can slide longitudinally.

2. Description of the Related Art

Such wholes are known per se, one of them, for instance, being disclosed in French Patent No. 2.062.083.

SUMMARY OF THE INVENTION the object of the present invention is to improve such a whole while adding thereto means permitting modification of the force of the return resilient device and, consequently, the pressure which the two assembled elements exert one on each other.

Said object is achieved by reason of the fact that the sleeve of the assembly device is provided with a threaded portion on which is screwed a tightening ring, bearing on the second of the said elements to be assembled, in such a way that the force of the return device and, consequently, the pressure exerted by one of the elements of the assembly on the other one, is variable in function of the axial position of the said sleeve, which position is adjustable while screwing more or less the said ring.

BRIEF DESCRIPTION OF THE DRAWING

The drawing shows, by way of example, one embodiment constructed in accordance with the object of the invention.

DESCRIPTION OF THE PREFERRED EMBODIMENT

Figure 1:
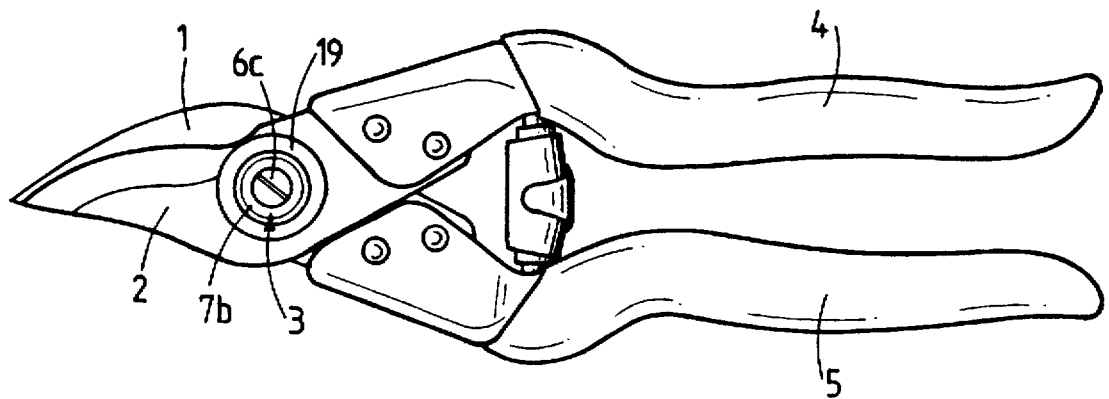
FIG. 1 is a plan view of a secateur for use in gardening.
Figure 2:
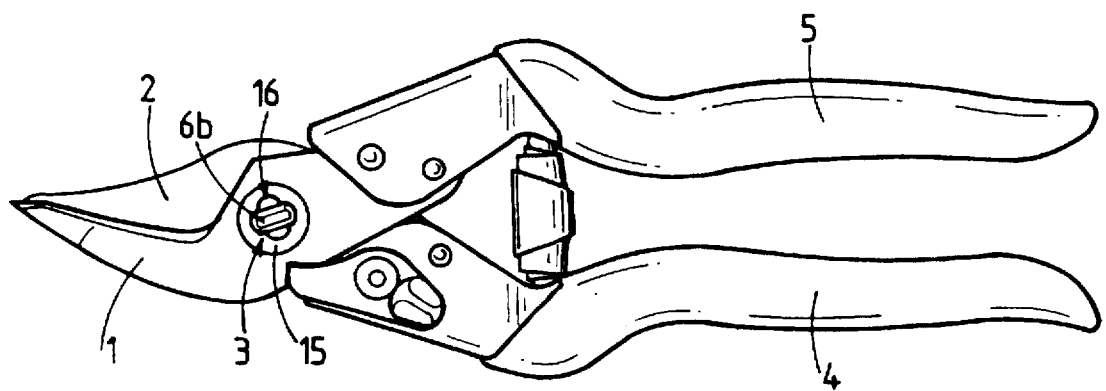
FIG. 2 is a plan view of a secateur represented in a position, turned over with respect to the position of FIG. 1.
Figure 3:
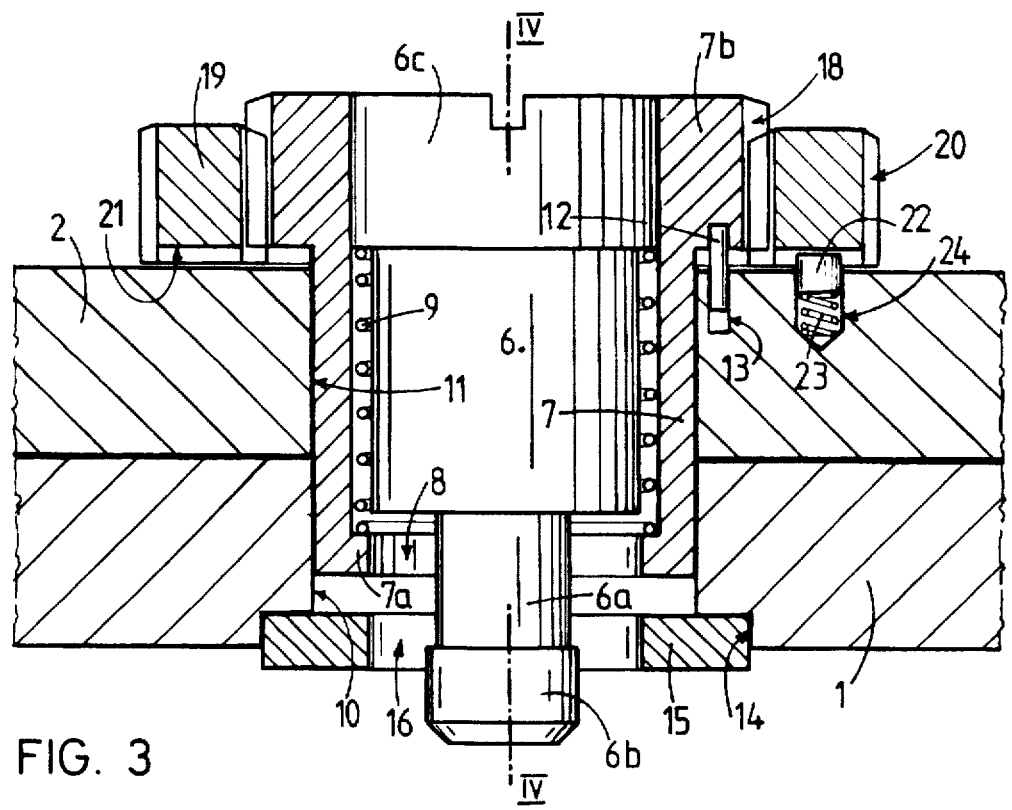
FIG. 3 is an axial sectional view of the assembly device for the two jaws of the secateur.
Figure 4:
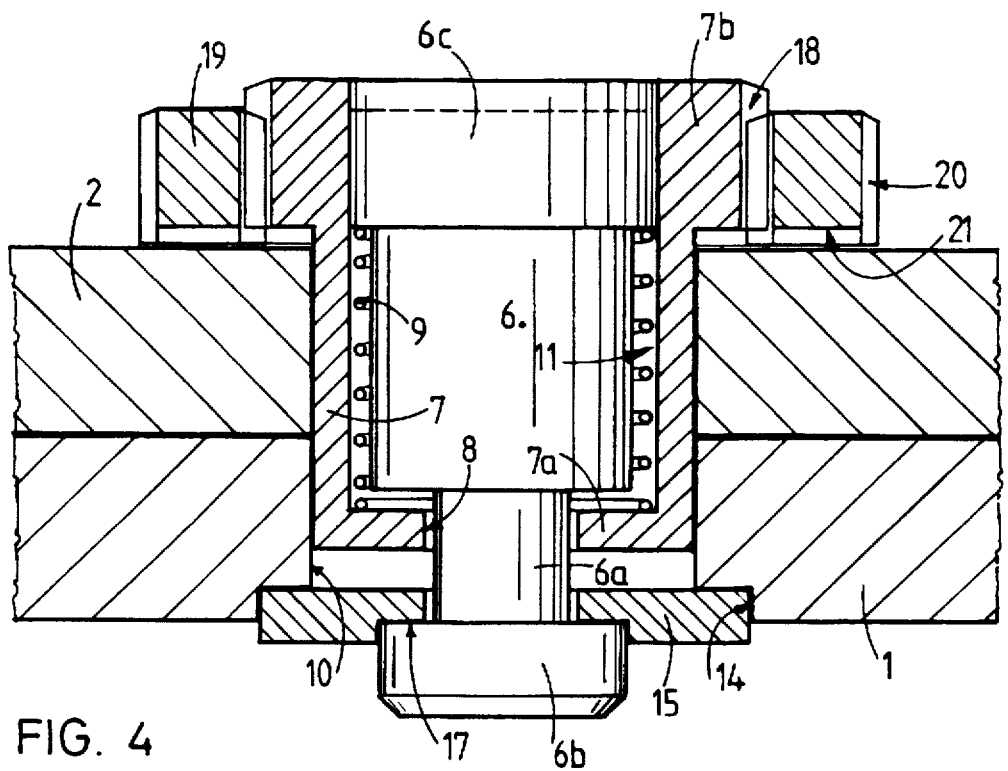
FIG. 4 is a sectional view taken along the line IV—IV of FIG. 3.

The secateur represented in the form of a cutter comprises two jaws 1 and 2, articulated with respect to each other about point 3, and which are each provided with handle portions 4 and 5 respectively.

The articulation of the two jaws 1 and 2, one with respect to the other, is realized by a stud 6 terminating, at one of its extremities, by a portion 6a of smaller diameter provided with two diametrically opposed lugs 6b and, at the other extremity, by a head 6c of a slightly larger diameter.

The stud 6 is engaged in a sleeve 7 the bottom 7a of which is provided with an elongated aperture 8 intended to permit the passage of the two lugs 6b. A coil spring 9 is located in the sleeve 7, interposed between said sleeve and the stud 6, and bearing on the one hand on the bottom 7a of the sleeve and on the other hand on the head 6c of the stud. The sleeve 7, provided with the stud 6 and with the spring 9, is engaged in two passages 10 and 11 provided in the jaws 1 and 2, respectively, in which it is able to slide axially. A pin 12 carried by a head 7b of the sleeve 7, the axis of which is parallel to the axis of the sleeve, is engaged in a blind hole 13 of the jaw 2, thus preventing the sleeve 7 from rotating on itself with respect to the said jaw.

The jaw 1 carries, forced in a recess 14 it presents to this effect, a ring 15 provided with an elongated opening 16 permitting the passage of the lugs 6b of the stud 6 and which is provided with two recesses 17 situated on a diameter which is perpendicular to the opening 16, in which are partially engaged the lugs 6b under the effect of the return force exerted by the spring 9.

At last, the head 7b of the sleeve 7 is threaded at 18 and a ring 19, the inside of which is threaded and the outside of which is knurled at 20, is screwed on the said head 7b.

While screwing sore or less the ring 19 which bears on the jaw 2, one modifies the axial position of the sleeve 7 and, consequently, the tension of the return spring 9. Hence, the force exerted by said spring varies in function the position of the adjusting ring 19, and also the pressure exerted by the two jaws 1 and 2 on each other.

In order to prevent the ring 19 for the adjustment of the tension of the spring 9 from being screwed or unscrewed untimely, the axial face of said spring turned towards the jaw 2 is provided with radial scratches 21 with which cooperate a stud bolt 2 submitted to the action of a return spring 23 located in a blind hole 24 provided in the jaw 2. Said stud bolt operates like a jumper when the ring 19 is rotated, but prevents it from rotating from itself untimely. One could provide a radial lug carried by said stud bolt 22 and which would engage a notch provided in the jaw 2, that would prevent the said stud bolt from rotating on itself.

The present device may be applied not only to any articulation, but also to a mere tightening device, with adjustment of the pressure exerted by the two members one against the other, for instance the two portions of circles of spectacles rims, surrounding the glasses, the tightening force of which has to be able to be adjusted very precisely so as to prevent any risk of damaging the glasses.

I claim:

1. Whole formed by two elements assembled together by a device effecting assembly of said elements, said device comprising, a stud including at least one radial lug, said stud secured to one of said elements by said one radial lug, said one element including a passage having a recess on the outer face thereof for receipt of said lug, said lug being maintained within said passage by a return resilient device which bears at one end thereof on said stud and at the other end on said one element, a sleeve positioned within said passage, said sleeve having a bottom with an opening therein for receipt therein of said lug, said return resilient device being positioned within said sleeve and bearing at one end thereof on said stud and at the other end on said bottom, said sleeve being engaged between said elements and being slidable longitudinally within said passage, said sleeve having a threaded portion, a tightening ring screwed on said threaded portion, said tightening ring bearing on the other of said elements, whereby the force of the return resilient device and the pressure exerted by one of the elements on the other element is variable according to the axial position of said sleeve as the tightening ring is screwed upon said sleeve.

2. Whole as claimed in claim 1 in which said sleeve is maintained angularly rigid with respect to said other element such that said ring is able to be screwed upon said sleeve without rotating said sleeve, said other element being rotatable about said stud without changing the relative position between the ring and the sleeve and thereby without changing the tension exerted by the return resilient device.

3. Whole as claimed in claim 1 in which the return resilient device is formed as a coil spring engaged upon said stud and located within the confines of said sleeve.

* * * * *